H. C. BABCOCK.
Improvement in Baling Manure.
No. 128,454.            Patented July 2, 1872.
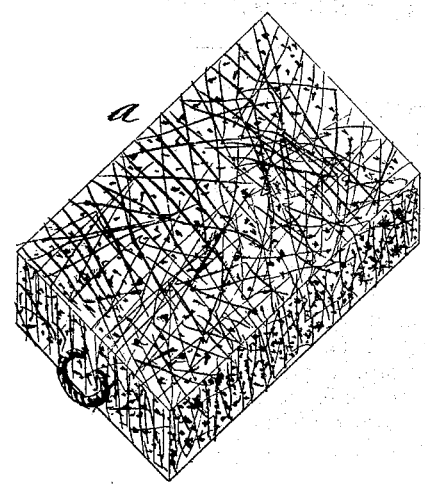
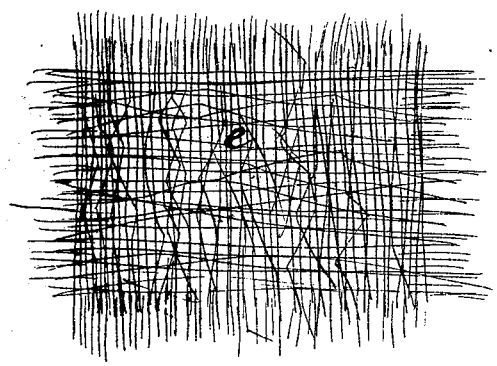
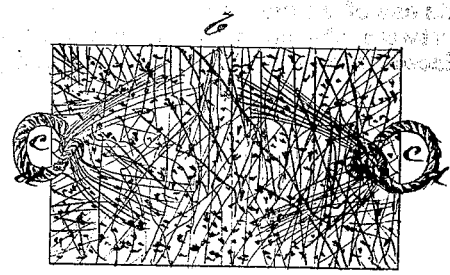

128,454

UNITED STATES PATENT OFFICE.

HOLLAND C. BABCOCK, OF HARTFORD, CONNECTICUT.

IMPROVEMENT IN BALING MANURES.

Specification forming part of Letters Patent No. 128,454, dated July 2, 1872.

*To all whom it may concern:*

Be it known that I, HOLLAND C. BABCOCK, of the city and county of Hartford and State of Connecticut, have invented a new and useful Improvement in Preparing Manure for Storage, Transportation, or Market; and to enable others skilled in the art to practice the same, I will proceed to describe, referring to the drawing and letters marked thereon.

The nature of this invention consists in compressing manure into compact form, so that it can be easily handled and rapidly packed in storage, in greatly reduced bulk, and with greater facility of handling and rapidity of loading and unloading, and with less liability of heating.

In the accompanying drawing, *a* represents a compressed bale or package of manure. *b* is a section of the same, showing a whisp, *c*, formed of any suitable material, and compressed firmly into the bale, forming handles *d*, for lifting, loading, and unloading said bales. *e* represents one of a number of tiers of litter placed between the layers of manure while being placed in readiness for being packed or compressed in any of the common ways of compressing material into a solid body.

By this improvement I am enabled to prepare manure for storage in holds of vessels, which ship-masters heretofore have been unwilling to receive because of its heating proclivity, which, by this invention, is obviated, because a sufficient air-space can be secured between the bales, thereby doing away with the use of forks and shovels in loading and unloading, or handling for shipment or storage.

I believe I have thus shown the nature and advantage of this invention, so as to enable others skilled in the art to practice the same therefrom.

What I claim, and desire to secure by Letters Patent, is—

A bale of manure formed and pressed into layers, and with or without handles embedded substantially as set forth.

HOLLAND C. BABCOCK.

Witnesses:
O. S. KELSEY,
JEREMY W. BLISS.